(12) United States Patent
Carter et al.

(10) Patent No.: US 7,275,675 B1
(45) Date of Patent: Oct. 2, 2007

(54) FRICTION STIR WELD TOOLS

(75) Inventors: Robert W. Carter, Auburn, AL (US); Lewis N. Payton, Auburn, AL (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 148 days.

(21) Appl. No.: 10/928,876

(22) Filed: Aug. 20, 2004

(51) Int. Cl.
*B23K 20/12* (2006.01)
*B23K 37/00* (2006.01)

(52) U.S. Cl. .................................. 228/2.1; 228/112.1

(58) Field of Classification Search ............ 228/112.1, 228/2.1
See application file for complete search history.

(56) References Cited

U.S. PATENT DOCUMENTS

| | | | |
|---|---|---|---|
| 3,822,821 A | 7/1974 | Clarke | |
| 5,460,317 A * | 10/1995 | Thomas et al. | 228/112.1 |
| 5,718,366 A | 2/1998 | Colligan | |
| 5,794,835 A | 8/1998 | Colligan et al. | |
| 5,853,119 A | 12/1998 | Searle | |
| 5,875,953 A | 3/1999 | Shioya | |
| 5,893,507 A * | 4/1999 | Ding et al. | 228/2.1 |
| 5,971,251 A | 10/1999 | Moore et al. | |
| 6,029,879 A | 2/2000 | Cocks | |
| 6,050,475 A | 4/2000 | Kinton et al. | |
| 6,053,391 A | 4/2000 | Heideman et al. | |
| 6,138,895 A | 10/2000 | Oelgoetz et al. | |
| 6,206,268 B1 | 3/2001 | Mahoney | |
| 6,227,430 B1 | 5/2001 | Rosen et al. | |
| 6,230,957 B1 | 5/2001 | Arbegast et al. | |
| 6,264,088 B1 | 7/2001 | Larsson | |
| 6,299,048 B1 | 10/2001 | Larsson | |
| 6,302,315 B1 | 10/2001 | Thompson | |
| 6,325,273 B1 | 12/2001 | Boon et al. | |
| 6,367,681 B1 | 4/2002 | Waldron et al. | |
| 6,516,992 B1 | 2/2003 | Colligan | |
| 6,543,670 B2 | 4/2003 | Mahoney | |
| 6,783,055 B2 * | 8/2004 | Ezumi et al. | 228/112.1 |
| 2001/0004989 A1 | 6/2001 | Ezumi et al. | |
| 2001/0038027 A1 * | 11/2001 | Coletta et al. | 228/2.3 |
| 2001/0040179 A1 | 11/2001 | Tochigi et al. | |
| 2002/0011509 A1 | 1/2002 | Nelson et al. | |
| 2002/0014516 A1 | 2/2002 | Nelson et al. | |
| 2002/0179682 A1 | 12/2002 | Schlling et al. | |
| 2003/0019913 A1 * | 1/2003 | Ezumi et al. | 228/112.1 |
| 2003/0116609 A1 * | 6/2003 | Dracup et al. | 228/112.1 |
| 2003/0201307 A1 * | 10/2003 | Waldron et al. | 228/112.1 |

(Continued)

FOREIGN PATENT DOCUMENTS

| | | |
|---|---|---|
| EP | 0810055 A1 | 12/1997 |
| GB | 2306366 A | 5/1997 |
| WO | WO 02/070186 A1 | 3/2001 |

*Primary Examiner*—Jonathan Johnson
*Assistant Examiner*—Rachel E. Beveridge
(74) *Attorney, Agent, or Firm*—James J. McGroary; Stephen J. Stark

(57) ABSTRACT

A friction stir weld tool sleeve is supported by an underlying support pin. The pin material is preferably selected for toughness and fracture characteristics. The pin sleeve preferably has a geometry which employs the use of an interrupted thread, a plurality of flutes and/or eccentric path to provide greater flow through. Paddles have been found to assist in imparting friction and directing plastic metal during the welding process.

12 Claims, 3 Drawing Sheets

U.S. PATENT DOCUMENTS

2004/0118899 A1* 6/2004 Aota et al. ............... 228/112.1
2005/0067461 A1* 3/2005 Waldron et al. ............. 228/2.1
2005/0103824 A1* 5/2005 Waldron et al. ......... 228/112.1
2006/0175382 A1* 8/2006 Packer et al. ............ 228/112.1

* cited by examiner

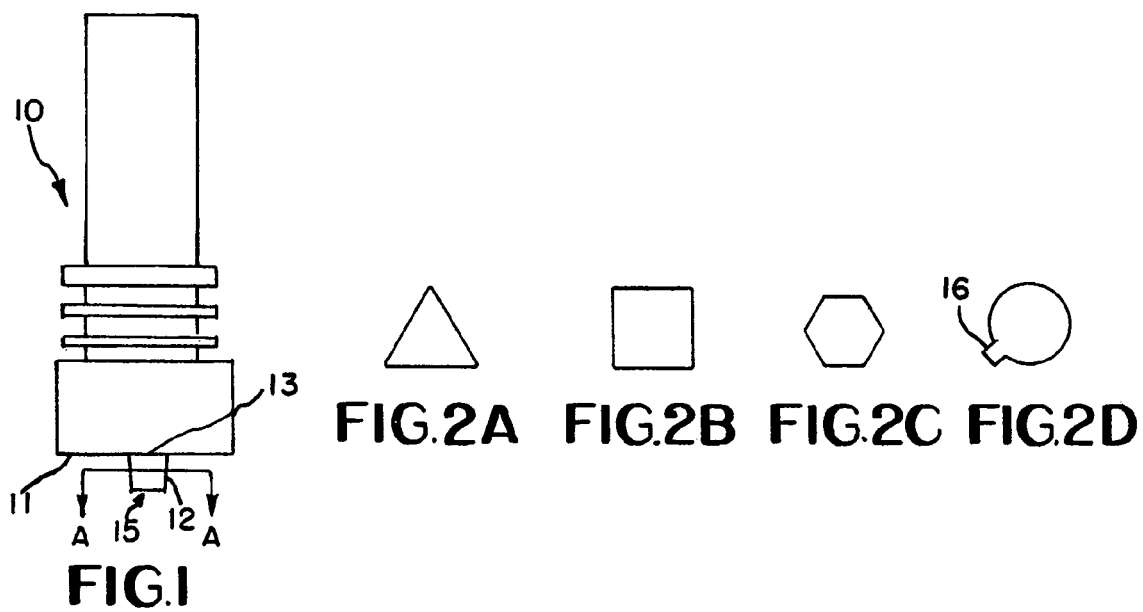
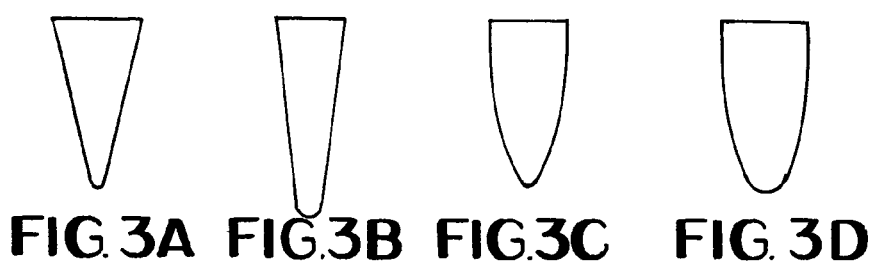
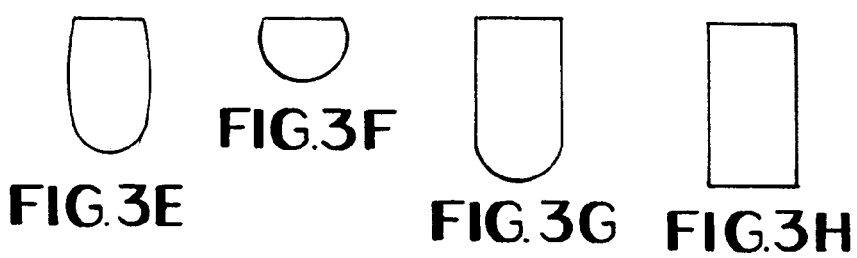
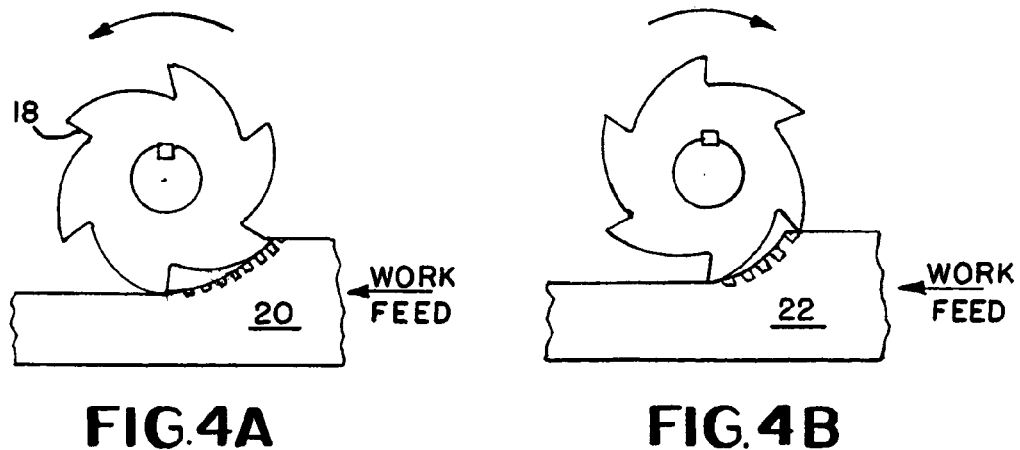

FRICTION STIR WELD TOOLS

STATEMENT OF GOVERNMENT INTEREST

The invention described herein was made in part by an employee of the United States Government and may be manufactured and used by or for the Government of the United States of America for governmental purposes without the payment of any royalties thereon or therefor.

BACKGROUND OF THE INVENTION

1. Field of the Invention

This invention relates to friction stir welding pin-tools, and more particularly to pin design and the pin surface geometry which engages a workpiece.

2. Description of Related Art

Friction Stir Welding (FSW) is a solid-state welding process that uses a non-consumable rotating pin-tool to make linear welds. Typical pin-tools consist of a cylindrical "shoulder" and a smaller diameter protruding "pin". The process is initiated by plunging the rotating pin-tool into a weld joint until the shoulder is in intimate contact with the surface of the work piece. After the pin-tool has reached its final plunge depth a dwell-time is initiated wherein the material surrounding the pin-tool is heated by friction and plastic deformation. Travel is initiated after sufficient dwell-time, and the weld is created by literally stirring plasticized material together under compressive forces generated by the tool shoulder. Finally, the weld is concluded by halting travel and withdrawing the rotating pin-tool from the work piece.

Friction stir welding (FSW) is a relatively new technology but because of its broad applicability in the welding industry (as a replacement for fusion welding processes) it is the focus of significant research and development. The process is still in its infancy and has already been implemented in several production applications in the aerospace, automotive, rail, and trucking industries.

Accordingly, improvements in pin-tool design are believed to be important to provide industry with quality tools so that FSW will be an attractive option for manufacturers and metal workers.

Several patent applications have been filed, and some patents granted on friction stir welding tools. U.S. Patent Application Publication No. US 2002/0011509 shows a probe for friction stir welding having a shank, a shoulder and a pin-tool. No pin sleeves are shown or described in this reference. U.S. Patent Application Publication No. US 2002/0179682 shows a method and apparatus for joining work pieces by friction welding comprising a rotatable shaft which is biased toward a workpiece to plasticize an engaged area of the workpiece. A sleeve element moves toward the workpiece as the shaft is removed in order to push plasticized material back into the workpiece.

U.S. Patent Application Publication No. US 2002/0014516 shows a friction stir welding tool comprising a probe including a shank, shoulder and a pin disposed through the shoulder and into the shank, wherein the pin and the shoulder at least include a coating comprised of a super abrasive material, and having a collar around a portion of the shoulder and the shank to thereby prevent movement of the shoulder relative to the shank, and incorporating thermal management by providing a thermal flow barrier between the shoulder and the shank, and between the collar and the tool.

U.S. Patent Application Publication No. US 2001/0004989 shows a friction stir welding tool having a cylindrical body and at least one flash cutter formed integrally to the cylindrical body of the tool.

Other patents and applications showing FSW technology include U.S. Pat. No. 6,543,670 showing an interface preparation for weld joints, U.S. Patent Application Publication No. US 2001/0040179 showing a friction agitation joining apparatus for joining a plurality of abutted members, U.S. Pat. No. 5,875,953 showing a method and apparatus for effecting interference fit of two parts by accelerating the part or parts, U.S. Pat. No. 5,460,317 showing friction welding utilizing a number of differently shaped pin-tools, U.S. Pat. No. 6,367,681 showing a friction stir welding apparatus and method with a fairly typical stir welding tool, U.S. Pat. No. 6,516,992 showing one embodiment having a threaded pin-tool, U.S. Pat. No. 6,230,957 showing a method of using friction stir welding to repair weld defects and to help avoid weld defects in intersecting welds, U.S. Pat. No. 206,268 showing a friction stir welding pin-tool with internal flow channels, U.S. Pat. No. 5,971,251 showing a method of welding a terminal to a flat flexible cable, U.S. Pat. No. 6,325,273 showing a friction welding apparatus and method showing one or more metal with a spaced apart probes having a crescent shaped cross-section, U.S. Pat. No. 6,299,048 showing a pin-tool having threaded exterior surfaces, U.S. Pat. No. 6,264,088 showing pin-tools having a threaded exterior surface, U.S. Pat. No. 6,227,430 showing a friction stir weld tool for thick weld joints having four sections of thread tapers, U.S. Pat. No. 6,053,391 showing a friction stir welding tool having a unique thread configuration, U.S. Pat. No. 6,029,879 showing a probe having both right-handed and left-handed threads, U.S. Pat. No. 5,893,507 showing an auto-adjustable pin-tool for friction stir welding with what appears to be a traditional pin-tool, U.S. Pat. No. 5,713,507 showing a programmable friction stir welding process with a pin depth sensor, U.S. Pat. No. 6,138,895 showing a manual adjustable probe tool for friction stir welding, U.S. Pat. No. 6,302,315 showing a friction stir welding machine and method having a threaded pin-tool shown in FIG. 5, U.S. Pat. No. 3,822,821 showing a friction welding apparatus which includes a carrier member to receive a component to be friction welded to the workpiece, U.S. Pat. No. 5,718,366 showing a friction stir welding tool for welding variable thickness workpieces, U.S. Pat. No. 6,050,475 showing a method and apparatus for controlling downforce during friction stir welding, and finally, U.S. Pat. No. 5,697,544 showing an adjustable pin-tool for friction stir welding.

Foreign patents have also been filed for friction stir weld improvements. FIG. 2D of Great Britain Patent No. GB 2 306 366 shows a probe having a plurality of projections for mixing plasticized material. European Patent Application No. EP 0 810 055 as well as PCT Patent Application WO 02/070186 also show friction stir welding pin-tool.

While many improvements have been initiated, none are believed to satisfactorily address pin-tool strength, durability, wear resistance and stress management.

SUMMARY OF THE INVENTION

As can be seen from the prior art, there exists a need for a FSW tool which provides a tool pin design allowing for greater traverse speeds and an increased tool life.

Another object is to provide for an ability to operate at higher temperature and torque load.

Another object is to provide a FSW pin-tool to handle high start up torque.

Another object is to provide improved wear characteristics of FSW pin-tools.

Accordingly, the present invention provides a friction stir weld pin-tool which is supported by an underlying support pin. The pin material is preferably selected for toughness and fracture characteristics. The pin has a geometry which advantageously connects with an external sleeve. Although external sleeves can take a variety of geometries, the presently preferred geometry employs the use of one of an interrupted thread, an odd number of flutes, and/or an eccentric path to provide greater thru-flow. Abrasive surface geometries may also be utilized. Furthermore, paddles on an exterior surface of the sleeve may also be utilized to advantageously stir plastic metal during the welding process.

BRIEF DESCRIPTION OF THE DRAWINGS

The particular features and advantages of the invention as well as other objects will become apparent from the following description taken in connection with the accompanying drawings in which:

FIG. 1 shows a side plan view of a body for use in FSW process with integral shoulder and smaller diameter protruding support pin;

FIGS. 2A-D shows four presently preferred cross-sectional configurations for the support pin shown in FIG. 1;

FIGS. 3A-H shows alternatively preferred pin sleeve embodiments;

FIGS. 4A and B are top plan views of an even number of flutes illustrating the concepts of up-milling and down-milling;

DETAILED DESCRIPTION OF THE PREFERRED EMBODIMENT

Figure 8:
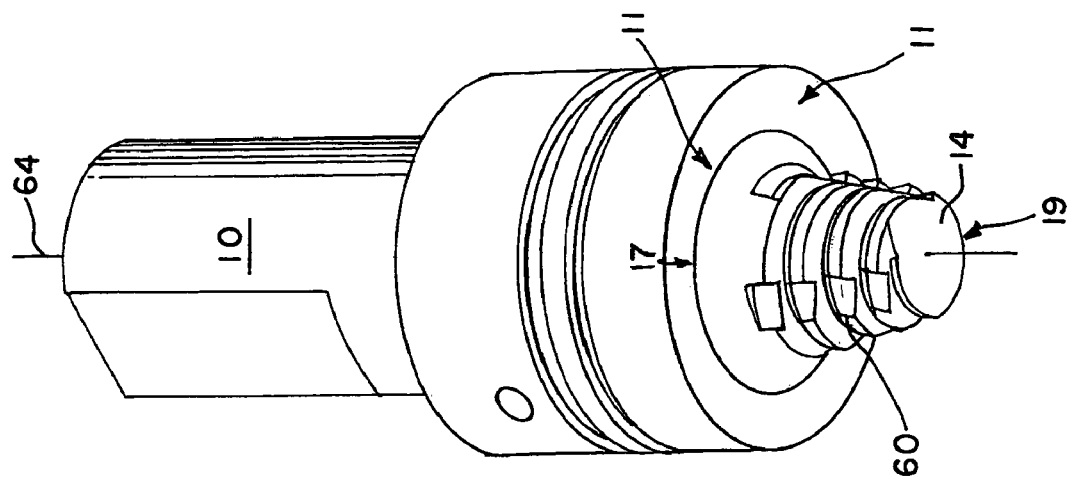
FIG. 8 shows a side perspective view of the presently preferred embodiment of the pin-tool connected to the shaft of FIG. 1.
Figure 7:
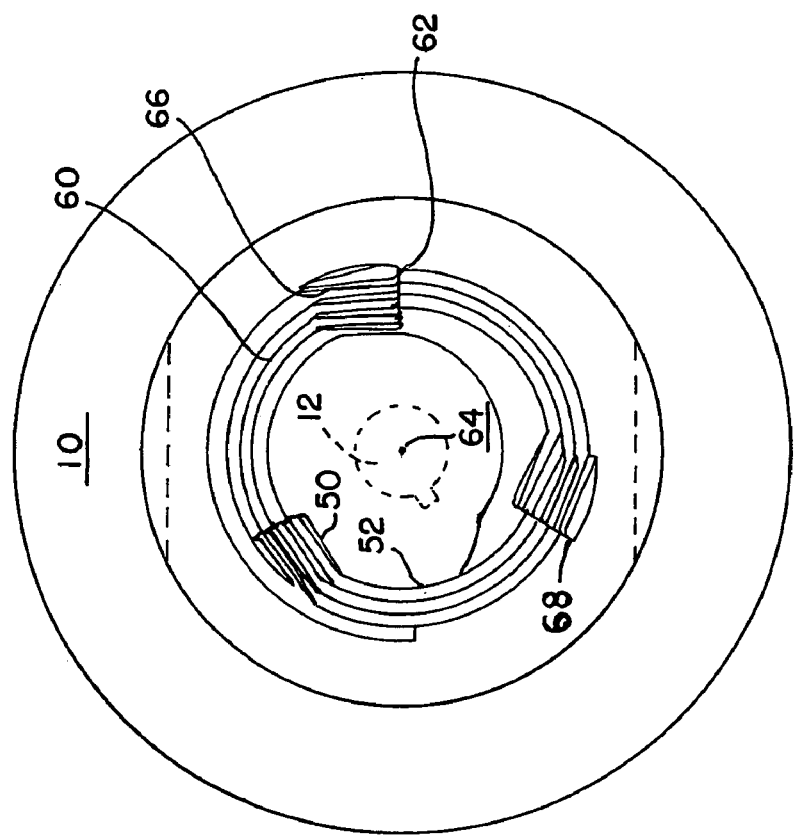
FIG. 7 shows a bottom plan view of a pin-tool connected in accordance with the presently preferred embodiment.

FIG. 1 shows a tool body with integral shoulder 10 and integral smaller diameter protruding support pin 12 in accordance with the presently preferred embodiment of the present invention. While tool bodies with integral shoulders have been known in the art, the support pin 12 is believed to be new. The body, shoulder and pin 10, 11 and 12 rotate together about rotational axis 64. The pin 12 is selected from material for toughness, fracture, wear resistance, and other characteristics. The pin 12 may have a coating and/or sleeve intermediate the pin 12 and any of the alternatively preferred embodiments of tool sleeves as shown in FIGS. 3A-3H. The currently preferred embodiment of a tool sleeve is illustrated in FIGS. 7 and 8 as sleeve 14 connected to pin 12.

Figure 6:
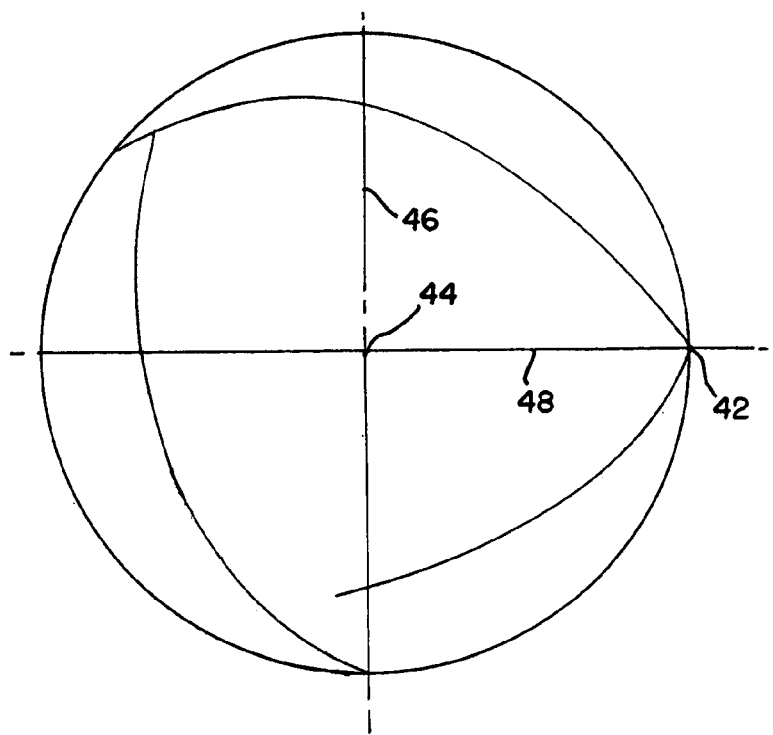
FIG. 6 shows the swath path of a three fluted tool.

FIG. 2 shows cross section embodiments taken along the line A-A of FIG. 1. These or other cross sectional embodiments could also be utilized. Any of the planar segments shown may be useful to prevent rotation of sleeve 14 relative to pin 12. Sleeves such as those shown in FIGS. 3A-3H or in the preferred embodiment shown in FIGS. 6, 7 and 8 are connected to pin 12 as shown in FIGS. 7 and 8. The body 10 has a shoulder 11. The pin 12 has proximal end 13 and distal end 15. The sleeve 14 has proximal end 17 and distal end 19.

FIG. 4 shows what machinists typically call "up-milling" and "down-milling." In any slotted cutting operation, where the tool is completely engaged in the material, both conditions exist simultaneously. It can be understood in that in this scenario there is an opposite piece of material opposite the workpiece from material as shown in FIGS. 4a and 4b. Accordingly, as the blades 18 rotate with the shaft 10 shown in FIG. 1, when a first blade contacts the workpiece 20 as shown in FIG. 4A, an opposite blade in an even number configuration contacts a second workpiece 22 as shown in FIG. 4B. The terms "advancing side" and "retreating side" refer to the up-milling and down-milling sides without identifying the tool action itself since the tool continues to rotate about the axis of the shaft 10.

Figure 5:
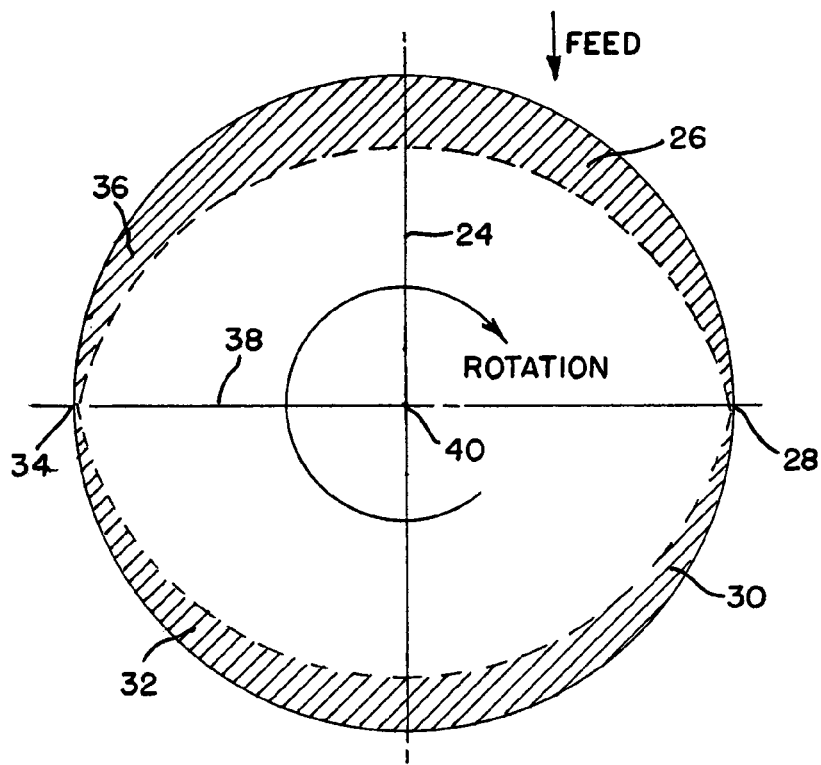
FIG. 5 shows a swath path for a four fluted work pin.

In the tool design, as represented by the swath path FIG. 5, having an even number of flutes such as four, continuous threads a smooth surface, a "nipping action" can occur where a flow of material "thru" or the tools' cutting volume. In FIG. 5 the tool is rotating clockwise and is being fed up the longitudinal axis 24 so that the direction of feed is established. This represents the workpieces passing about and below the tool which are not shown in FIG. 5. The swath path of the tool is shown.

The apparent swath path of a four bladed tool is represented at FIG. 5. Namely, area 26 is the apparent swath of the first flute which pinches at point 28 before the apparent swath path of the second flute 30 is commenced. The apparent swath path of the third flute 32 continues until reaching the pinching point 34 before beginning the apparent swath path of fourth flute 36. Fourth flute 36 is on the advancing side (upmilling) while first flute 26 is on the retreating side or downmilling side. As can be seen from this diagram and understood by one skilled in the art, the pinching points 28, and 34 are undesirable since they block the flow of material at these points.

However, when using an odd number of flutes as shown in FIG. 6, the pinching action does not occur on opposite portions of axis 38 at the pinching points 28, and 24 opposite one another about the axis of rotation 40 as shown in FIG. 5. By utilizing a three fluted tool, a single pinching point 42 may occur relative to axis of rotation 44 of axes 46 and 48. Since there are not a number of evenly spaced flutes, there is not a corresponding pinch point opposite the axis of rotation 44 from the pinch point 42. A similar result can be had with an interrupted thread, a smooth pin with an eccentric path such as caused by the tilting of the tool relative to the workpieces and for the flattening of a side of the pin engaging the workpieces. A much greater thru flow can be had than with the even sided design as shown in FIG. 5. FIG. 6 shows the presently preferred embodiment having a plurality of paddles 50 disposed on threads 52 which wind about the sleeve 14. The paddles 50 are disposed with the threads 52 on exterior surface 60 of the sleeve 14. The paddles 50 interrupt threads 52 as shown in the preferred embodiment. The paddles have a forward planar face 62 which is preferably either substantially perpendicular to the threads or parallel to and contained in a plane intersecting the shaft axis 64. The paddles 50 are preferably odd in number and as they are substantially evenly spaced about the exterior surface of the sleeve 14. The sleeve 14 preferably tapers from its proximal end 17 to its distal end 19. The paddles 50 may have a planar back 66 which extends from distal end 68 of planar face to threads 52. The sleeve is connected to a pin 12 as shown in FIG. 7. FIG. 8 shows the shoulder. This design is believed to enhance the formation of the nugget at all speeds, and permits higher transverse speeds without danger of shearing the pin-tool.

As can be seen in FIGS. 7 and 8 the sleeve 14 has a bore which cooperates with pin 12 so that sleeve 14 is locked on the pin 12. The pin 12 has been selected for its toughness, temperature and load characteristics. The pin 12 has been manufactured to support a sleeve 14 like a cover which is inserted over the supporting pin 12. The construction of the sleeve 14 preferably out of rhenium or other wear-resistant material has been preferably chosen for its ability to withstand temperatures and compressive wear. The sleeve 14 preferably includes the use of threads, flutes, and/or abrasives in order to engage material being joined by a friction stir welding technique. A compressive fit may be utilized to join the pin 12 to the sleeve 14 in conjunction with slotted key way and/or riding surfaces to support and attach the pin 12 to sleeve 14. These may be coated to provide satisfactory thermal characteristics. Internal sleeves with satisfactory thermal characteristics may be utilized as liners in interior coatings intermediate the pin 12 and sleeve 14. In other embodiments the sleeve 14 may be fabricated directly onto the underlying support pin 12 via other methods.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A friction stir weld tool comprising:
    a rotatable shaft;
    a pin connected to a distal portion of the shaft, said pin disposed along the axis of rotation of the shaft, said pin having a cross section with at least one planar segment;
    a sleeve connected to the pin extending about the pin, said sleeve having an outer surface with an odd number of paddles evenly spaced about a circumference of the sleeve and the outer surface of the sleeve further comprising threads; wherein the paddles interrupt the threads.

2. A friction stir weld tool comprising:
    a rotatable shaft;
    a pin connected to a distal portion of the shaft, said pin disposed along an axis of rotation of the shaft, said pin having a cross section with at least one planar segment;
    a sleeve connected to the pin extending about the pin, said sleeve having an external surface with threads and a plurality of paddles, said paddles having a planar face substantially perpendicular to the axis of rotation of the shaft, and the paddles have a planar back which extends from a distal end of the planar face to the threads;
    wherein the paddles are odd in number and evenly spaced about a circumference of the external surface.

3. A friction stir weld tool comprising:
    a rotatable shaft;
    a pin connected to a distal portion of the shaft, said pin disposed along an axis of rotation of the shaft, said pin having a cross section with at least one planar segment;
    a sleeve connected to the pin extending about the pin, said sleeve having an external surface with threads and a plurality of paddles, said paddles having a planar face substantially perpendicular to the axis of rotation of the shaft and
    the paddles have a planar back which extends from a distal end of the planar face to the threads.

4. A friction stir weld tool comprising:
    a shaft driven about a rotation axis;
    a pin-tool having an exterior surface, said exterior surface having threads, said pin-tool connected to a distal end of the shaft;
    said exterior surface having a larger circumference toward the shaft than at a distal end of the pin-tool; and
    a plurality of paddles interrupting the threads.

5. The friction stir weld tool of claim 4 wherein the paddles are odd in number and evenly spaced about the exterior surface of the pin-tool.

6. The friction stir weld tool of claim 5 wherein the paddles have a forward planar face extending substantially perpendicularly to the threads.

7. The friction stir weld of claim 6 wherein the paddles have a back plan face extending from a distal end of the forward planar face to the threads.

8. The friction stir weld tool of claim 4 wherein the pin-tool further comprises a sleeve connected to a pin, said pin having at least one planar face oriented parallel to the axis of rotation.

9. A friction stir weld tool comprising:
    a shaft rotatably driven about an axis of rotation and having a distal end;
    a pin extending from the distal end of the shaft and terminating at a distal end;
    a sleeve connected to the pin and terminating at a distal end with the distal end of the sleeve extending out distally past the distal end of the pin, and an exterior surface;
    threads disposed about the exterior surface of the sleeve; and
    paddles having forward planar faces, said forward planar faces oriented to be at least one of substantially perpendicular to the threads and parallel to the axis of rotation;
    and the paddles have a planar back which extends from the distal end of the planar face to the threads.

10. The friction stir weld tool of claim 9 wherein said sleeve has a larger circumference toward the shaft than at the distal end of the sleeve.

11. The friction stir weld tool of claim 9 wherein the pin has at least one planar face, said planar face perpendicular to the axis of rotation of the shaft.

12. The friction stir weld tool of claim 9 wherein the forward planar faces are disposed in a plane intersecting the axis of rotation of the shaft.

* * * * *